United States Patent [19]

Nabeshima et al.

[11] Patent Number: 4,943,824
[45] Date of Patent: Jul. 24, 1990

[54] DEVICE FOR MEASURING OBJECT DISTANCE USED FOR CAMERA

[75] Inventors: Takayuki Nabeshima; Toru Matsui; Yukio Maekawa, all of Osaka, Japan

[73] Assignee: Minolta Camera Kabushiki Kaisha, Osaka, Japan

[21] Appl. No.: 269,598

[22] Filed: Nov. 10, 1988

[30] Foreign Application Priority Data

Nov. 12, 1987 [JP] Japan ................. 62-286964
Nov. 12, 1987 [JP] Japan ................. 62-286965
Nov. 12, 1987 [JP] Japan ................. 62-286966
Nov. 12, 1987 [JP] Japan ................. 62-286967
Nov. 12, 1987 [JP] Japan ................. 62-286968

[51] Int. Cl.⁵ .................. G03B 3/00; G01C 3/08
[52] U.S. Cl. .................. 354/400; 354/403; 356/4
[58] Field of Search ............ 354/400–408; 250/201 R, 201 PF, 204; 356/1, 4

[56] References Cited

U.S. PATENT DOCUMENTS 4,614,418 9/1986 Ishizaki et al. .................. 354/407
4,660,969 4/1987 Sorimachi et al. ............... 354/403 X
4,748,469 5/1988 Tamura ............................ 354/403

FOREIGN PATENT DOCUMENTS 59-146028   8/1984  Japan .
60-36905    2/1985  Japan .
60-233610  11/1985  Japan .
61-124191   6/1986  Japan .
61-124192   6/1986  Japan .
61-246612  11/1986  Japan .
60-246613  11/1986  Japan .
62-14015    1/1987  Japan .
62-255911  11/1987  Japan .

Primary Examiner—W. B. Perkey
Attorney, Agent, or Firm—Burns, Doane, Swecker & Mathis

[57] ABSTRACT

The present invention relates to a device for measuring object distance or an in-focus position used for a camera in which the object distance of focus adjusting condition are measured in a plurality of distance measuring areas in the photographing scene. The device is so constructed as to judge a main object from weight data in correspondence not only with the object distance of each distance measuring area but with the position thereof in the photographing scene. Further, when there is an object nearer than a predetermined distance, the main object is judged from whether the object has a size larger than a predetermined size in the photographing scene. Furthermore, it is judged from the difference between the object distances of adjacent distance measuring areas whether the objects are the same object.

15 Claims, 15 Drawing Sheets

Gxy

| x\y | 1 | 2 | 3 | 4 | 5 | 6 | 7 | 8 | 9 |
|---|---|---|---|---|---|---|---|---|---|
| 1 | 1 | | | | | | | | |
| 2 | | 1 | 1 | 1 | | | | | |
| 3 | | 1 | 1 | 1 | 1 | 1 | | | |
| 4 | | 1 | 1 | 1 | 1 | 1 | | | |
| 5 | | | 1 | 1 | 1 | 1 | | 1 | |
| 6 | | | 1 | 1 | 1 | 1 | | 1 | |
| 7 | | | | | | | | 1 | 1 |
| 8 | | | | | 1 | 1 | | 1 | |
| 9 | | | | | | | | 1 | 1 |

Hzy

| z\y | 1 | 2 | 3 | 4 | 5 | 6 | 7 | 8 | 9 |
|---|---|---|---|---|---|---|---|---|---|
| 1 | (1) | | | | | | | | |
| 2 | | (1) | 1 | 1 | 1 | 1 | | (1) | |
| 3 | | 1 | 1 | 1 | 1 | 1 | | 1 | |
| 4 | | 1 | 1 | 1 | 1 | 1 | | 1 | |
| 5 | | 1 | 1 | 1 | 1 | 1 | | 1 | |
| 6 | | 1 | 1 | 1 | 1 | 1 | | 1 | |
| 7 | | | | | | | | (1) | (1) |
| 8 | | 1 | 1 | 1 | 1 | 1 | | 1 | |
| 9 | | | | | | | | 1 | 1 |

Isy

| s\y | 1 | 2 | 3 | 4 | 5 | 6 | 7 | 8 | 9 |
|---|---|---|---|---|---|---|---|---|---|
| 1 | 1 | | | | | | | | |
| 2 | | 1 | 1 | 1 | 1 | 1 | | 1 | |
| 3 | | | | | | | | 1 | 1 |

DEVICE FOR MEASURING OBJECT DISTANCE USED FOR CAMERA

BACKGROUND OF THE INVENTION AND RELATED ART STATEMENT

The present invention relates to a device for measuring object distance or an in-focus position to be focus controlled used for a camera in which object distances or focus adjusting condition of a plurality of objects in the photographing scene are measured by projecting a plurality of bundles of ray on objects and receiving the reflected lights thereof.

As conventional so-called multipoint object distance measuring devices in which object distances of a plurality of objects in the photographing scene are measured, known are a device in which the focus of a focusing lens is adjusted simply on the nearest object according to object distance data of respective distance measuring areas (disclosed, for example, in Japanese Laid-open Patent Publication No. 62-14015), and another device in which object distance of central portion of the photographing scene and one or both of objects distance of adjacent portion thereto are measured, and the focus of a focusing lens is adjusted on an object of the mean object distance among the measured object distances (disclosed, for example, in Japanese Laid-open Patent Publication No. 59-146028).

However, in these devices, the focus of a focusing lens is adjusted simply on the nearest object or on an object of the mean distance of a plurality of object distances. Accordingly, in the former case, if an object locates at a nearer position than a position of a main object intended by a photographer to be focus adjusted, focus is sometimes adjusted on that unintended nearer object. And in the latter case, sometimes the main object comes outside the depth of field when another object such as a background has a strong influence. In the conventional devices, focus of a focusing lens cannot always be adjusted on a photographer's intended main object as abovementioned, which calls for improvements of conventional devices.

Further, in the conventional devices, no account is taken of the flashlight photographing. In other words, in the flashlight photographing, sometimes focus is adjusted on an object farther than the flashlight reaching distance, and in such a case, time is wasted for judging which is the main object and an erroneous photographing occurs due to under exposure.

SUMMARY OF THE INVENTION

The present invention has been made for eliminating the abovementioned disadvantages of the conventional devices.

The first object of the present invention is to provide a device for measuring object distance or an in-focus position used for a camera in which, by giving weight data to objects in correspondence with object distance data thereof and the position of each object in the photographing scene, the focus of a focusing lens can be adjusted on a photographer's intended object whatever composition be selected.

A device for measuring object distance or an in-focus position used for a camera according to the present invention in which the object distances are measured in a plurality of distance measuring areas in the photographing scene, said device comprises a calculating means having a plurality of weight data predetermined in correspondence with the position of each distance measuring area in the photographing scene and object distance, for calculating a weight value by reading the weight data of each distance measuring area in correspondence with the position of an object in the photographing scene and the measured object distance respectively, and means for judging to be a main object, an object in the distance measuring area of which the weight value calculated by the calculating means is the largest.

The second object of the present invention is to provide a device for measuring object distance or an in-focus position used for a camera in which the focus of a focusing lens can be correctly adjusted on an object as abovementioned by judging a main object with taking the size of an object in the photographing scene into consideration.

A device according to the present invention comprises a means for detecting the size of each object in the photographing scene in every distance measuring area and in relation to the object distance, and judging an object having a size larger than a predetermined reference size to be a main object.

According to the present invention, in judging a main object by a multipoint distance measurement, the size of an object within the photographing scene is detected in relation to the object distance. Accordingly, when there is an object nearer than a predetermined distance and having a size larger than a predetermined size within the photographing scene, the object can be judged to be a main object, and the focus of a photographic lens can be adjusted on the main object.

The third object of the present invention is to provide a device for measuring object distance or in-focus position used for a camera in which a main object can be correctly detected by judging a main object from a detected difference between the object distances of the adjacent distance measuring areas.

A device according to the present invention comprises a means for comparing the difference between the object distances of the adjacent distance measuring areas and judging that the objects in the adjacent distance measuring areas are the same object when the difference between the object distances is within a predetermined value.

According to the present invention in detecting a main object by a multipoint distance measurement, object in the adjacent distance measuring areas are judged to be the same object only when the distance between the object distances of the adjacent distance measuring areas is within a predetermined value, and therefore the size of the object within the photographing scene can be correctly judged to enable the detection of a main object.

The fourth object of the present invention is to provide a device for measuring object distance or in-focus position used for a camera in which, in judging a main object by measuring the object distances at a plurality of points in the photographing scene, a main object can be correctly detected and judged by using properly selected judging process in correspondence with the object distance.

A device according to the present invention comprises a means for judging a main object base d on the size of an object within the photographing scene when there are one or more objects in the position nearer than a predetermined distance, and judging a main object from the position of an object in the photographing scene and the object distance when there is no object in the position nearer than a predetermined distance or When there is no object of a predetermined size in the photographing scene.

According to the present invention, in judging a main object by the multipoint distance measurement, the judging process is properly selected in correspondence with the object distance in such a manner that when the object distance is short, a main object is judged from the size of the object in the photographing scene, and when there is no object in the near position or when there are no object of a predetermined size, a main object is judged from the position of an object in the photographing scene and the object distance, and consequently a main object can be correctly judged. In other words, in the conventional device in which a main object is detected only by object distance data or in which focal length of a photographic lens is adjusted at the mean value of the object distances of a plurality of objects, erroneous distance measurement and erroneous focus adjustment will take place with a high possibility when there is a photographer's unintended object in the peripheral portion of the photographing scene, but according to the present invention, a main object can be correctly judged even in such a case. Further, by using properly selected one of a plurality of judging processes in correspondence with the photographing condition, the judging time can be shortened.

The fifth object of the present invention is to provide a device for measuring object distance or in-focus position used for a camera, in which, in judging a main object by the multipoint distance measurement, in the case of flashlight photography, the abovementioned judging process is not executed with respect to objects farther than the flashlight reaching distance, so that the wasteful judging time can be saved and erroneous photographing can be prevented.

A device according to the present invention comprises a means for comparing, in flashlight photography, the object distance of each distance measuring area with the flashlight reaching distance, and carrying out a process of judging a main object with respect only to the distance measuring areas in which there are one or more objects nearer than the flashlight reaching distance.

According to the present invention, in judging a main object by the multipoint distance measurement, in the case of flashlight photography, a process of judging a main object is not executed with respect to objects farther than the flashlight reaching distance, so that the wasteful judging time can be saved and thereby the judging time can be shortened Further, it can be avoided to judge as a main object, an object at a distance beyond reach of the flashlight, and erroneous photographing due to under exposure can be prevented.

DETAILED DESCRIPTION OF THE INVENTION

Figure 1:
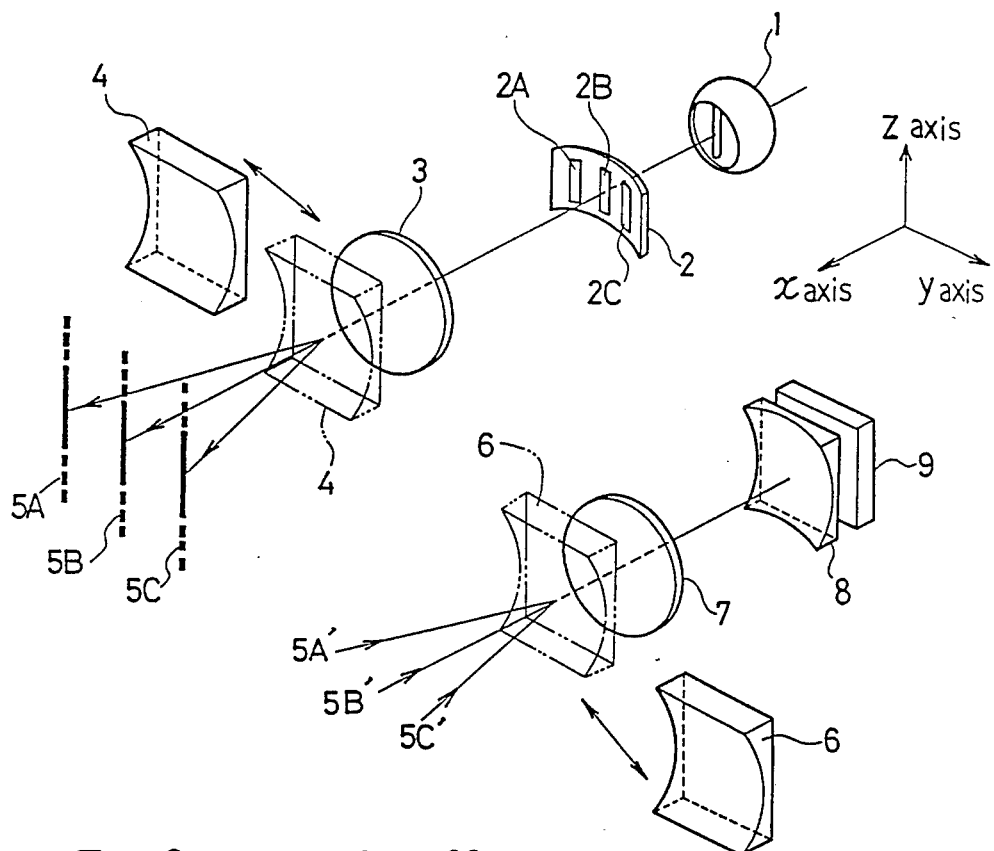
FIG. 1 is a perspective view schematically showing the basic arrangements of an embodiment of a device for measuring the object distance used for a camera according to the invention.

FIG. 1 shows an example of an object distance measuring device of a multiple point measuring system, and the device comprises, as the main arrangements, a light projecting section and a light receiving section respectively disposed in front of a camera body so as to be spaced from each other by a predetermined base line length in the direction of x axis in this figure.

In FIG. 1, a light source 1 comprises an infrared light emitting diode, a flashlight xenon tube or the like, and ahead of the light source 1 are disposed a slit plate 2 and a light projecting lens 3, in the direction of x axis. The slit plate 2 is disposed in the focal plane of the light projecting lens 3 and provided with a plurality of (three in this figure) slits 2A, 2B, 2C with the enlongated side thereof being in the direction of z axis, i.e., vertical to the base line length. The slits 2A, 28, 2C are arranged adjacent to one another in the direction of V axis so as to be spread with respect to the photographing scene. The part other than the slits 2A, 2B, 2C of the slit plate 2 is so constructed as to shade the light. Further, in order to decrease unsharpness of or out-of focus slit images caused by the aberration of the light projecting lens 3 around the optical axis thereof, the slite plate 2 is slightly curved in the direction of correcting the out-of-focus image, for example, in a concaved manner.

Accordingly, rays of light projected from the light source 1 passes the slit plate 2 to be divided into three bundles of slit-shaped ray each being elongated in the direction of z axis. The slit bundles of ray pass the light projecting lens 3 to be projected toward an object to be photographed (not shown). Indications 5A, 5B and 5C designate the slit images. Portions of the slit images 5A, 5B, 5C shown by dotted lines show extended portion of the slit image for extending the distance measuring area in the photographing scene which is relatively reduced by changing a focal length of a photographic lens of a camera to a wider focal length. Such extension of the slit images can be achieved by disposing a cylindrical concaved lens 4 ahead of the light projecting lens 3 in such a manner that the rotation axis of the cylindrical face is parallel to the y axis.

The reflected lights 5A', 5B', 5C' of the slit bundles of ray projected on the object pass a light receiving lens 7 and an aberration correcting concave lens 8 and are incident upon light receiving elements 9 comprising a position sensor (PSD) or the like. When the cylindrical concave lens 4 is disposed ahead of the light projecting lens 3 in order to extend the slit, another cylindrical concave lens is disposed ahead of the light receiving lens 7 in such a manner that the rotation axis of the cylindrical face of the cylindrical concave lens 6 is parallel to the y axis in order to correct the extended portions.

Figure 2:
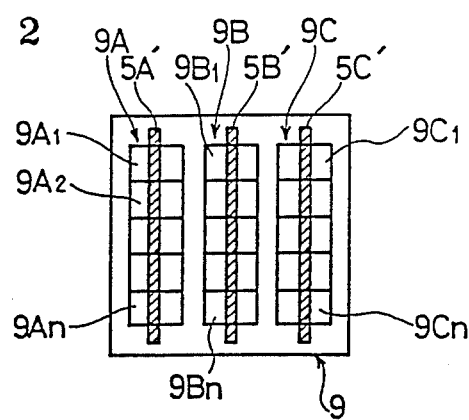
FIG. 2 is a view showing light receiving elements used in the device of FIG. 1 and reflected images incident on the light receiving elements.

FIG. 2 shows the light receiving elements 9 and reflected slit-shaped images incident upon the light receiving elements 9. In this figure, light receiving elements 9A, 9B, 9C are disposed respectively in correspondence to the reflected images 5A', 6B', 5C' marked with hatching lines. The light receiving elements 9A, 9B, 9C are respectively divided into n in the direction of enlongated side of the reflected slit images 5A', 5B', 5C', i.e., in the direction of z axis in FIG. 1, and each of the n-divided light receiving elements 9A1, to 9An, 9B1 to 9Bn, 9C1 to 9Cn independently outputs a signal indicating the light receiving position thereof.

Figure 3:
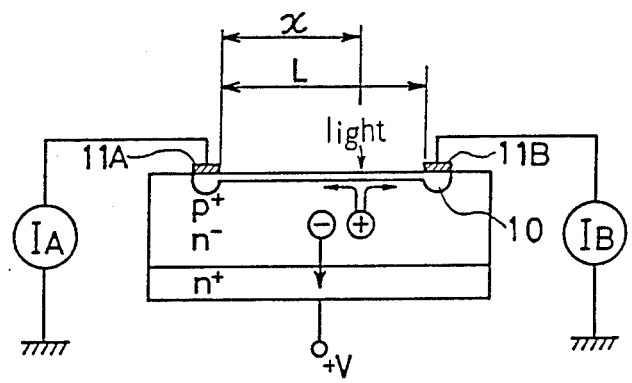
FIG. 3 is a sectional view showing the arrangement of the light receiving element.

Now, the construction of the receiving element will be described with reference to FIG. 3. In FIG. 3, a resistance member 10 is formed on the surface of the light receiving element, and when a light is incident upon the resistance member 10, electric currents IA, IB flow from a light incident position respectively to electrodes 11A, 11B. When the length between the electrodes 11A and 11B is indicated by L, the resistance by RL, the length from the electrode 11A to the light incident position by x, and the resistance between the electrode 11A and the light incident position by Rx, output currents IA and IB are represented as follows.

$$I_A = I_O(R_L - R_x)/R_L,$$
$$I_B = I_O \cdot R_x/R_L$$

wherein $I_O = I_A + L_B$

Here, since the resistance is in proportion to the length x, $$I_A = L_O(L - x)/L, \quad L_B = I_O \cdot x/L$$
$$I_A/I_B = (L - x)/x$$

Consequently, by finding the ratio of the output current $I_A$ to the output current $I_B$ from the abovementioned formula, the light incident position on the light receiving element can be detected.

Now, the principle of a device according to the present invention will be described.

Figure 4:
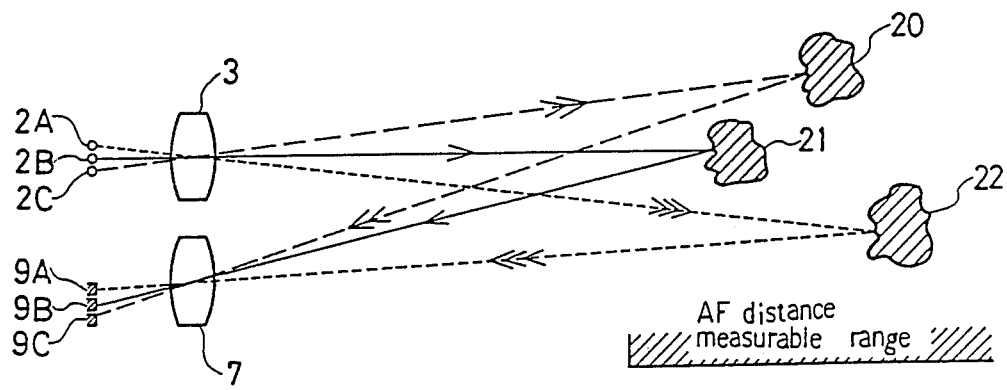
FIGS. 4(a), 4(b) are plan views for explaining the object distance measuring function of a device according to the present invention.
Figure 4:
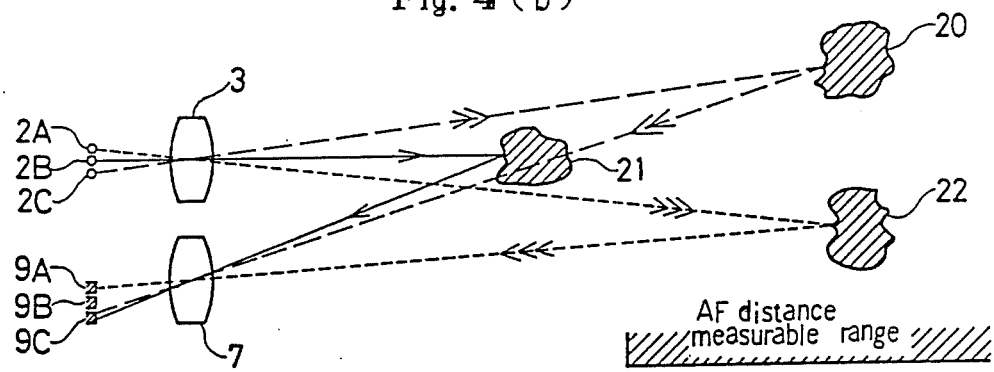

FIGS. 4(a), 4(b) show the functional arrangement of the device according to the present invention. In FIGS. 4(a), 4(b), slit shaped bundles of ray projected through the slits 2A, 2B, 2C pass the light projecting lens 3, and reflected by objects 20, 21, 22. The reflected lights pass the light receiving lens 7 and are incident upon the light receiving elements 9A, 9B, 9C. When the objects 20, 21, 22 are within an autofocusing (AF) distance measurable range (range from the shortest distance capable of measuring the object distance to the infinite distance), the reflected lights of the slit-shaped bundles of ray projected through the slits 2A, 2B, 2C are incident upon the corresponding light receiving elements 9A, 9B, 9C. Since the slit image moves on the light receiving element according to the distance to the object, the object distance in each area can be measured based on the principle of the triangulation. Based on this measurement, an instruction, for example, of adjusting the focus on the nearest object is given. The number and pitch of the slits are so designed that the reflected slit-shaped image from an object is not incident upon a light receiving element other than respective corresponding light receiving element when the object is within the AF distance measurable range. Further, the shortest AF distance measurable distance is set, for example, to be equal to the shortest photographic distance of a photographic lens.

FIG. 4(a) shows a case in which all the objects are within the AF distance measurable range, while FIG. 4(b) shows another case in which a part of the objects is on the side nearer than the AF distance measurable range. In FIG. 4(b), a slit shaped bundle of ray projected through the slit 2B passes the light projecting lens 3 and is projected on an object 21 on the nearer side than the AF distance measurable range, and the reflected light passes the light receiving lens and is incident on the light receiving element. Properly, the reflected light of a bundle of ray projected through the slit 2B is to be incident on the corresponding light receiving element 9B. However, since the object 21 is on the nearer side than the AF distance measurable range, the reflected light is not incident on the light receiving element 9B but is incident on the adjacent light receiving element 9C. In such a case, the output of the light receiving element 9 becomes larger than usual. Accordingly, when the output of the light receiving element is larger than a predetermined value, the object is regarded as being at a position nearer than the shortest photographic distance of the photographic lens, and a proper step is taken, for example, the focus is readjusted on an object in another area, or a warning of "too near object" is given.

Figure 5:
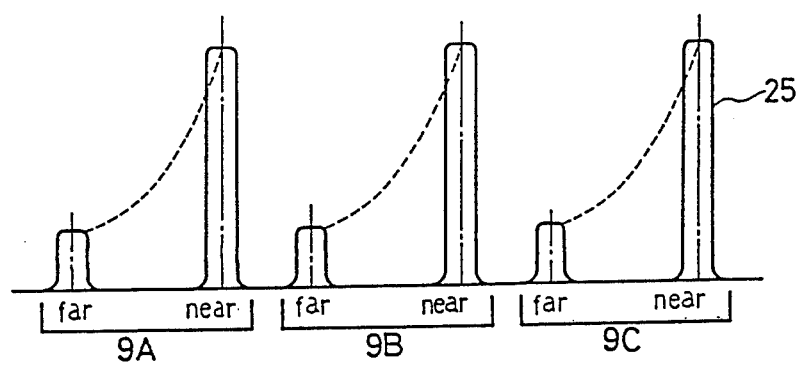
FIG. 5 is a view showing the relation between the received light amount on the light receiving element and the object distance with respect to the position of the reflected image on the light receiving element.

FIG. 5 shows the relation between the received light amount on the light receiving element and the object distance. As shown in FIG. 5, the received light amount 25 on the light receiving element becomes larger as the object distance becomes shorter. Accordingly, if the reflected light to be incident on the light receiving element 9B is incident on adjacent light receiving element 9C because the object is at a position nearer than the AF distance measurable range, the output of the light receiving element 9C becomes larger than usual, and when it becomes larger than a predetermined value, the object is judged to be at a position nearer than the shortest photographic distance of the photographic lens and then a proper step can be taken.

The distances to a plurality of areas in the photographing scene are measured according to the abovementioned principle of distance measurement, and the results of the measurements are processed. A device used for this processing will be not described in the folloWing with reference to a block diagram of FIG. 6.

Figure 6:
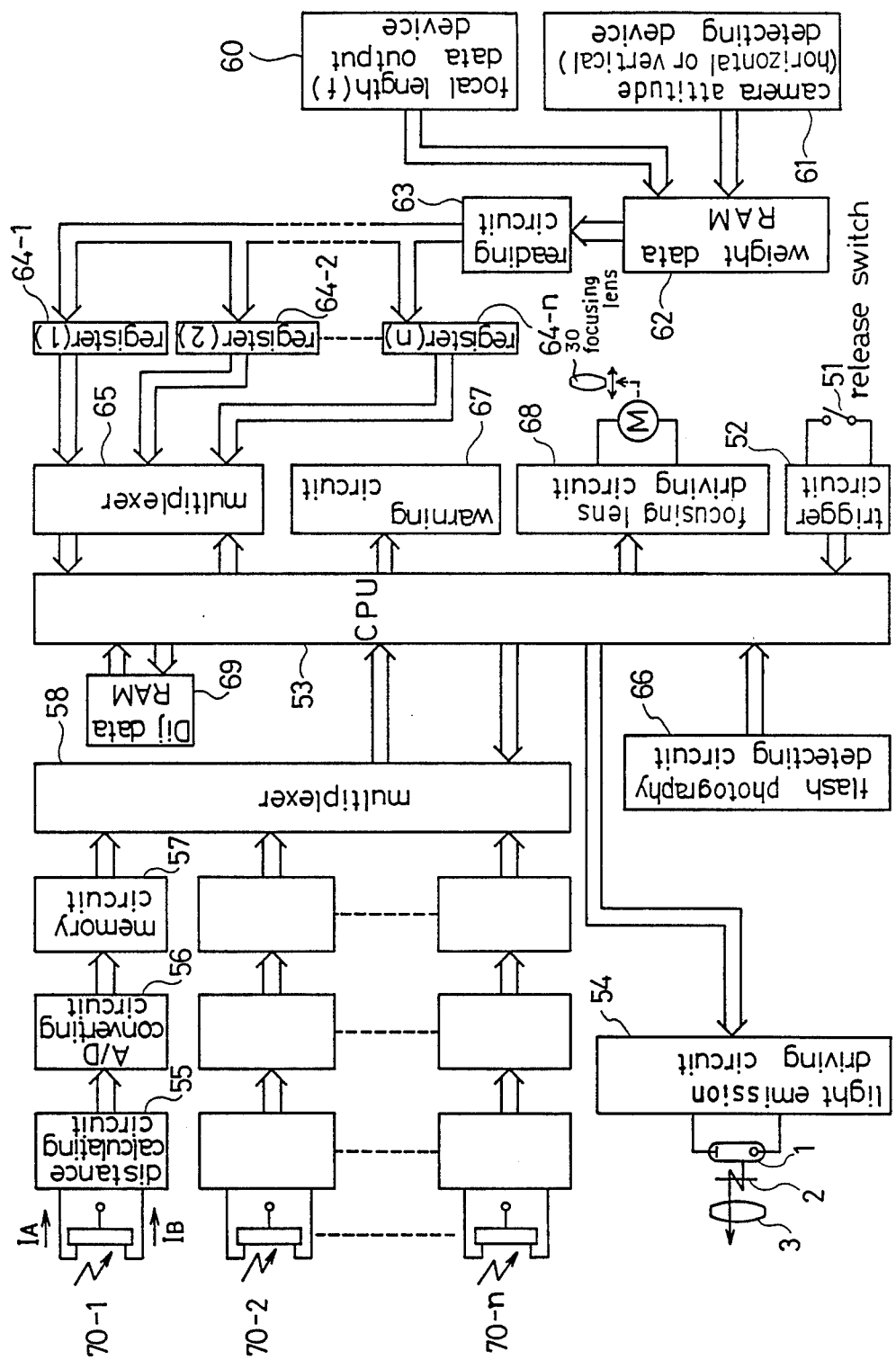
FIG. 6 is a block diagram showing an example of the concrete arrangements of a device according to the present invention.

In FIG. 6, when a release switch 51 is turned on, a trigger circuit 52 is operated to transmit a light emission signal through a CPU 53 to a light emitting element driving circuit 84 so that a light emitting element constituting a light source 1 is made to emit a light for the distance measurement. A bundle of ray projected from the light emitting element 1 passes through the slit plate 2 to be divided into a plurality of slit shaped bundles of ray. Then, the bundles of ray are projected through the light projecting lens 3 onto objects (not shown), and the reflected lights are incident on the respective corresponding light receiving elements 70-1 to 70-n i.e., light receiving elements 9A1 to 9An, 9B1 to 9Bn and 9C1 to 9Cn in FIG. 2. The electric currents IA, IB output from each light receiving element corresponds to the light incident position. A distance calculating circuit 55 calculates each object distance based on the electric currents IA, IB. The calculated value is A-D converted by each A-D converting circuit 56, and the obtained value is stored in each memory circuit 57.

Figure 7:
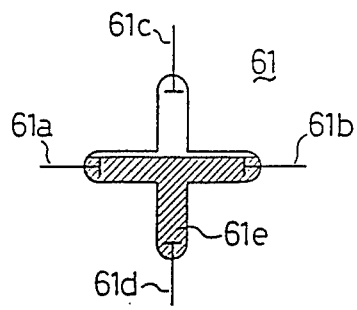
FIG. 7 is a view showing the arrangement of a camera attitude detecting means of FIG. 6, FIGS. 8, 9 are views for explaining distance measuring areas.

Further, simultaneously with the abovementioned distance measuring operation, the focal length f of the photographic lens is read from a focal length data output device 60 comprising a zooming lens encoder or the like of the photographic lens, and attitude of the camera body i.e., whether the camera body is placed in a horizontal attitude or a vertical attitude, is detected by a camera attitude detecting means 61 comprising a mercury switch or the like shown in FIG. 7. Based on these data, weight data in correspondence with respective distance measuring areas in the photographing scene preliminarily stored in a RAM 62 are read by means of a reading circuit 63. In FIG. 7, indications 61a to 61d designate electrodes and indication 61e designates mercury. Camera attitude is found by detecting which three of the electrodes 61a to 61d are conductive with each other by mercury 61e, for example the camera body is in a horizontal position With the electrodes 61a, 61b and 61d being conducted, and in a vertical attitude with the electrodes 61b, 61c and 61d being conducted.

Figure 8:
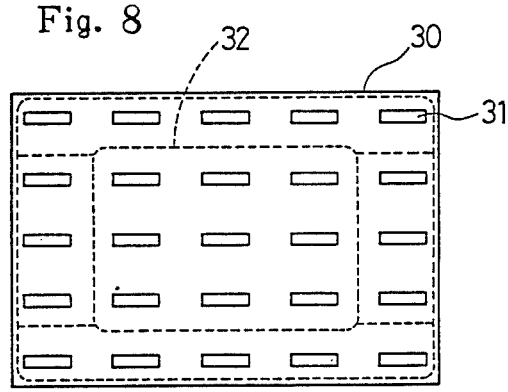
Figure 9:
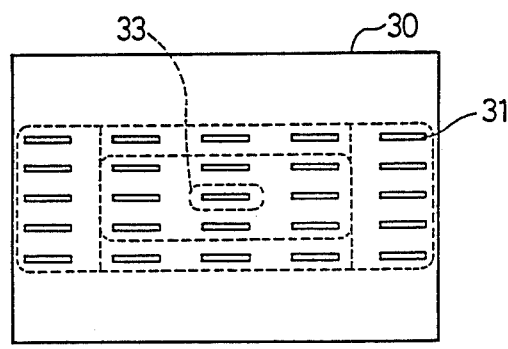
Figure 10:
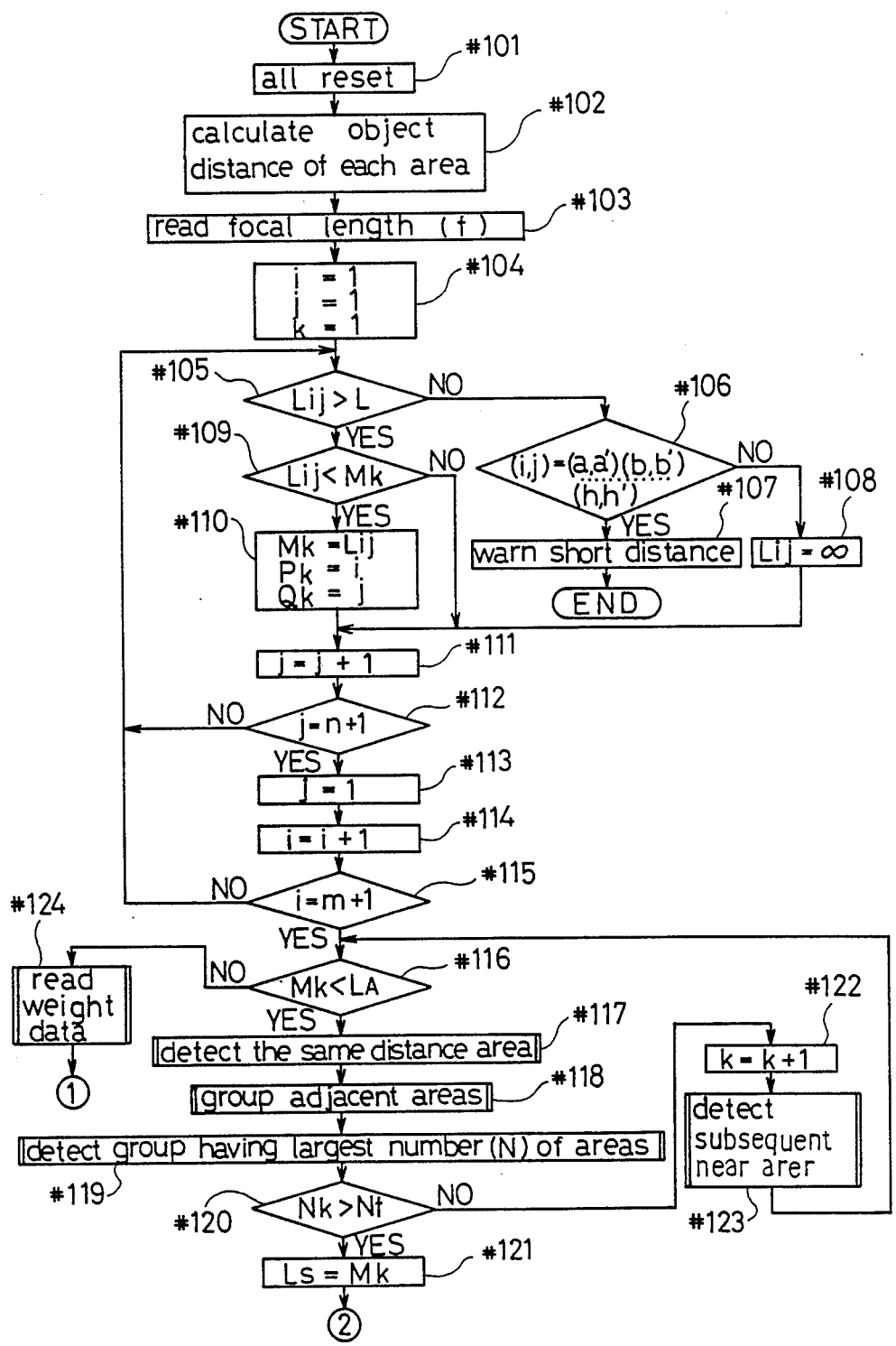
FIGS. 10 to 23 are flow charts showing operation of CPU of FIG. 6.

Now, an example of the abovementioned weight data will be described with reference to FIGS. 8 and 9. FIG. 8 shows a case in which a photographic lens is on the side of long focal length and FIG. 8 shows a case in which the photographic lens is on the side of short focal length. Both of FIGS. 8 and 9 show the distribution of a plurality of distance measuring areas 31 with respect to a photographing scene 30 and the weight partitions based on the position of the areas 31. When the photographic lens is on the side of long focal length as shown in FIG. 8, a maximum weight value (for example, 100) is given to nine distance measuring areas in the central portion 32. On the other hand, when the photographic lens is on the side of short focal length as shown in FIG. 9, a maximum weight value (for example, 100) is given to only one distance measuring area in the central portion 33. Further, weight data are given to each distance measuring area in the peripheral portion in such a manner that, with setting more importance on the central portion of the photographic scene, the weight value of a distance measuring area becomes smaller as the area is nearer to the periphery of the photographing scene, and further, among the pheripheral areas the upper area in the horizontal or vertical camera attitude has the smaller weight value. Such weight data are read by a reading circuit 63, and stored in registers (1) 64-1 to resisters (n) 64-n respectively corresponding to the light receiving elements 70-1 to 70-n.

Then, distance data stored in the memory circuit 57 are subsequently called by the CPU 53, and if the object distance detected in a distance measuring area in the central portion of the photographing scene is smaller than the shortest photographic distance of the photographic lens, a warning lamp is lit by a warning circuit 67. If there are no object in the position nearer than the shortest photographic distance in the central portion of the photographing scene, the weight data Dij in correspondence to respective distance data of the distance measuring area are read from Dij data RAM 69. In this case where the object in the position nearer than the shortest photographic distance is in the peripheral portion of the photographing scene, the object distance data of that distance measuring area is set at the infinite length level. Further, the weight data of the registers (1) to (n) in correspondence to respective light receiving elements are also called, and these data are calculated in the CPU to give order numbers respectively to the distance measuring areas and select a distance measuring area having the largest weight value. Then, by transmitting a signal to a focusing lens driving circuit 68, a focusing lens of the photographic lens is driven so as to adjust the focus thereof on the distance measuring area having the largest weight value.

The abovementioned operations will be now described in more detail with reference to flow charts of FIGS. 10 to 23.

Firstly, after beginning the operation, all of the memories and the like are reset at step #101. Then, the object distances of respective distance measuring areas are calculated at step #102, and the focal length f at that time is read at step #103. At step #1104, "i", "j" and "k" ("i" and "j" indicating the line and the column respectively of the distance measuring area described later and shown in FIG. 24, the line "i" ranging "1" to "m" and the column "j" ranging "1" to "n", and "k" being a coefficient) are reset (which means the initial setting at "1", and the same shall apply hereinafter), and the object distance Lij of the distance measuring area of the order number (i,j) is read. At step #105, it is judged whether the object distance Lij is larger than the shortest photographic distance L. When it is smaller than the shortest photographic distance L, it is judged whether the number of that distance measuring area is in conformity with the distance measuring areas in the predetermined central portion of the photographing scene at step #106. When the number is in conformity therewith, the distance measuring area in which the object nerear than the shortest photographic distance is located is judged to be in the central portion of the photographing scene, a warning "too near object" is given at step #107, and the CPU stops its operation. Since it hardly occurrs for a photographer to dispose an object nearer than the shortest photographic distance other than the main object in the center of the photographic scene and further, the main object is often disposed in the center of the photographing scene, a warning "too near object" is given when an object nearer than the shortest photographic distance is in the centeral portion of the photographing scene.

On the other hand, when it is judged that no object nearer than the shortest photographic distance is in the distance measuring area in the central portion of the photographing scene at step #106, it is regarded that an object unintended by a photographer enters in the peripheral portion of the photographing scene, and that object distance data is infinitely reset at step #108 in order to neglect the object distance data. It is because, in the belowmentioned calculation of the weight values of the distance measuring areas based on the position of an object in the photographing scene and the object distance, the weight value is set to be the smallest when the object distance is infinite. Further, when it is judged that the object distance of the distance measuring area of the number (i, j) is larger than the shortest photographic distance of the photographic lens at step #105, the object distance Lij is compared with the shortest object distance Mk at step #190. When Lij is smaller than Mk, the shortest object distance Mk is renewed by the object distance Lij, and at the same time the number (i, j) of that distance measuring area is stored in Pk and Qk respectively at step #110. Here, the smallest value of the foregoing object distances of the distance measuring areas is stored in Mk. Then, at step #111, "j" is incremented and at step #112, it is judged whether the abovementioned operation covering the distance measuring areas at the ends of each line has been completed. When it has not been completed, similar operation is carried out and when completed, "j" is reset at step #113, "i" being incremented at step #113, and it is judged whether the operation covering the last line of the distance measuring areas has been completed at step #115. When not completed, similar operation is repeated.

When it is judged that the operation covering all the distance measuring areas has been completed at step #115, the shortest object distance Mk stored at step #110 is compared with a predetermined distance LA at step #116. When Mk is smaller than LA, distance measuring areas of which the object distance is equal to or differs only by a difference within from the shortest object distance Mk are detected at step #117.

Figure 11:
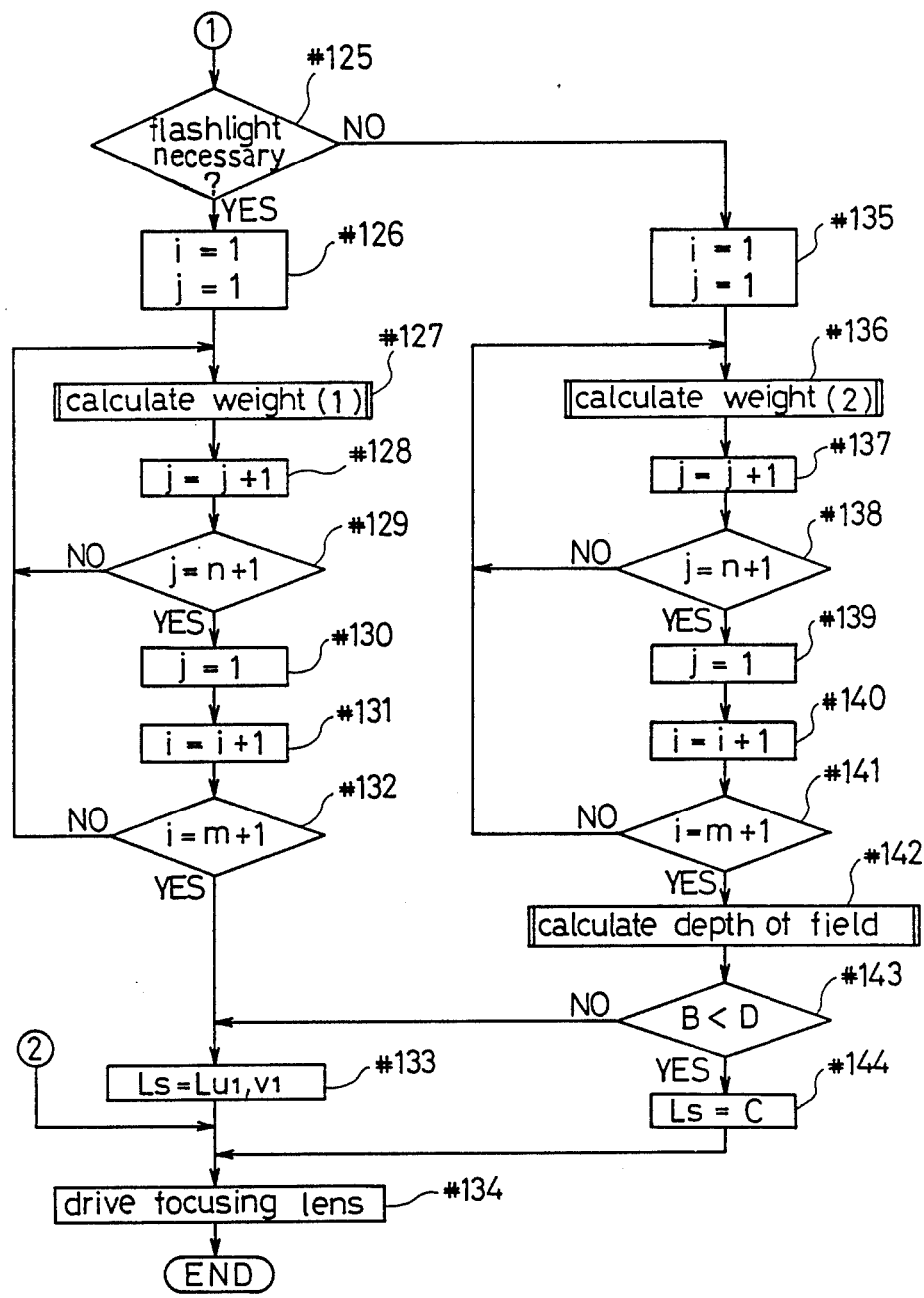

Nextly, the distance measuring areas detected at step #117 are grouped in such a manner that adjacent distance measuring areas make a group at step #118. At step #119, the number N of the distance measuring areas of contained in the same group is counted and the group having the largest number N of distance measuring areas is detected. Then, at step #120, it is judged whether the number Nk of the distance measuring areas of the largest group is larger than the number Nf of the distance measuring areas predetermined corresponding to the focal length "f" of the photographic lens. When Nk is larger than Nf, the largest group having Nk distance measuring areas is judged to be the main object, and at step #121, the photographic distance Ls is so set that the focus of the photographic lens is adjusted on an object of the object distance Mk, and the focusing lens is driven at step #134 (FIG. 11). On the other hand, when Nk is judged to be smaller than Nf at step #120, the coefficient k is incremented at step #122, a distance measuring area having object distance subsequent to the foregoing near object distance is detected at step #123, and then similar operation is repeated.

When the shortest object distance Mk is judged to be equal to or larger than the predetermined distance LA at step #116, predetermined weight data Wij based on the position of an object in the photographing scene are read at step #124. Then, it is judged by a flash photography detecting circuit 66 whether the flashlight is necessary or to be emitted at step #125, and when flashlight is necessary, "i" and "j" are respectively reset at step #126. At step #127, the weight data based on the position of an object in the photographing scene and the weight data based on the object distance are called to calculate the weight values for flash photography, and large weight values are stored (which will be described later). At steps #128 to #132, similar operations are repeated with respect to all of "m" lines by "n" columns of distance measuring areas. When the operations with respect to all the distance measuring areas have been completed, the largest weight value stored after the weight value calculation at step #127 is read, and at step #133, the photographic distance Ls is so set that the focus of the photographic lens is adjusted on an object in the distance measuring area having the largest weight value and the object distance Lu1v1, and at step #134, the focusing lens is driven and the operation is completed.

When the flashlight is not necessary at step #125, "i" and "j" are reset at step #135, and the weight values for daylight photography are calculated based on the position of an object in the photographing scene and the weight data based on the object distance, and the largest and the next to the largest weight values are successively stored (which will be described later) at step #136. At steps #137 to #141, similar operations are repeated with resect to all of "m" lines by "n" columns of distance measuring areas. When the operations with respect to all the distance measuring areas have been completed, it is judged whether objects in the distance measuring areas having the largest and the next to the largest weight values respectively are within the depth of field at steps #142 and #143. When they are within the depth of field, the photographic distance Ls is so set that both of the abovementioned objects are within the depth of field at step #144, and the focusing lens is driven at step #134. On the other hand, when the objects are judged not to be within the depth of field at step #143, the photographic distance Ls is so set that the focus of the photographic lens is adjusted on an object in the distance measuring area having the largest weight value at step #133, and the focusing lens is driven at step #134 to complete the operation.

Now, the operation of a device for measuring the object distance according to the present invention will be described partly in detail with reference to subroutines shown in FIGS. 12 to 23 in the context of the abovementioned whole description of the operation.

Figure 12:
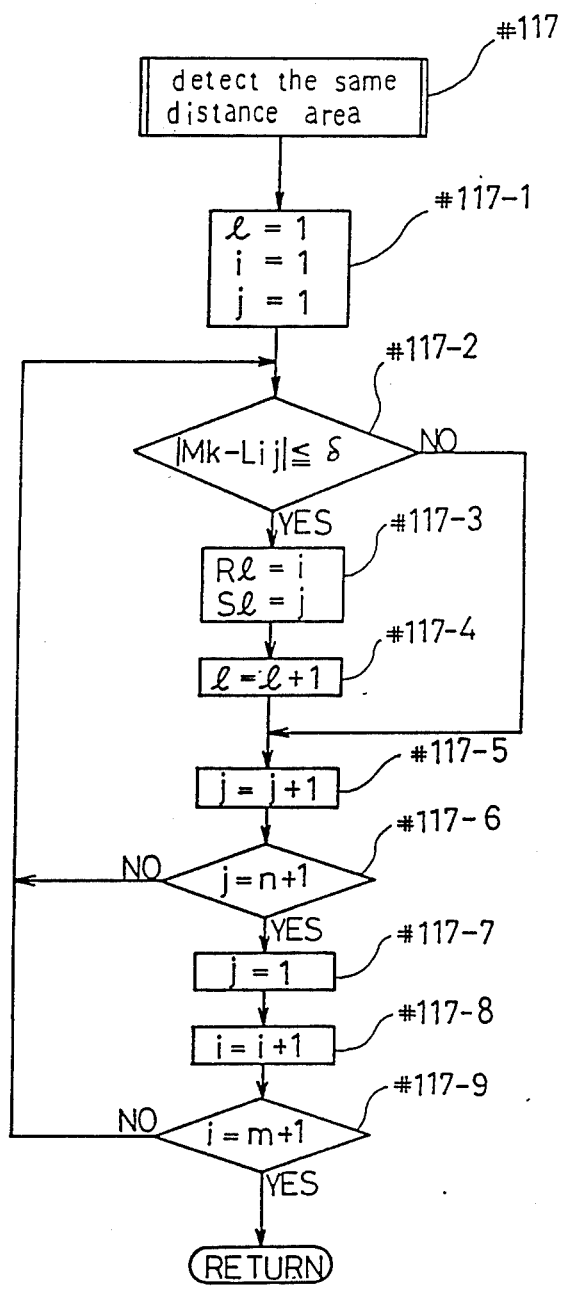
Figures 24, 25, 26, 27:
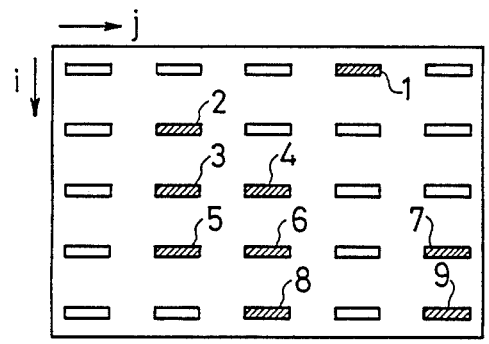
FIG. 24 is a plan view for explaining process of weighting data on distance measuring areas.
FIGS. 25 to 27 are graphs for explaining process of weighting data.

Firstly, in FIG. 12 showing a subroutine of detecting the distance measuring areas of the same distance at step #117, "1", "i" and "j" are reset at step #117-1, and at step #117-22, it is judged whether the difference between the object distance Lij of each distance measuring area and the shortest object distance or the object distance Mk successively detected at step #123 is within a predetermined value δ, and when the difference is within δ, the number (i, j) of that distance measuring area is stored in Rl and S1 st step #117-3, then "1" and "j" being respectively incremented at steps 117-4, 5. Then it is judged whether the operations with respect to the ends of each line of distance measuring areas have been completed at step #117-6, and when not completed, similar operations are repeated. On the other hand, operations with respect to the ends of each line of distance measuring area have been completed, "j" is reset at step #117-7, "i" being incremented at step #117-8, it being judged whether the operations with respect to the last line of distance measuring areas have been completed at step #117-9. When the operations with respect to all the distance measuring areas have not been completed, similar operations are repeated and when completed, the program returns to the main routine. An example of the operation of detecting the distance measuring areas having the same distance is shown in FIG. 24. FIG. 24 shows that the same distances are detected in the areas 1 to 9 remarked with hatching lines.

Figure 13:
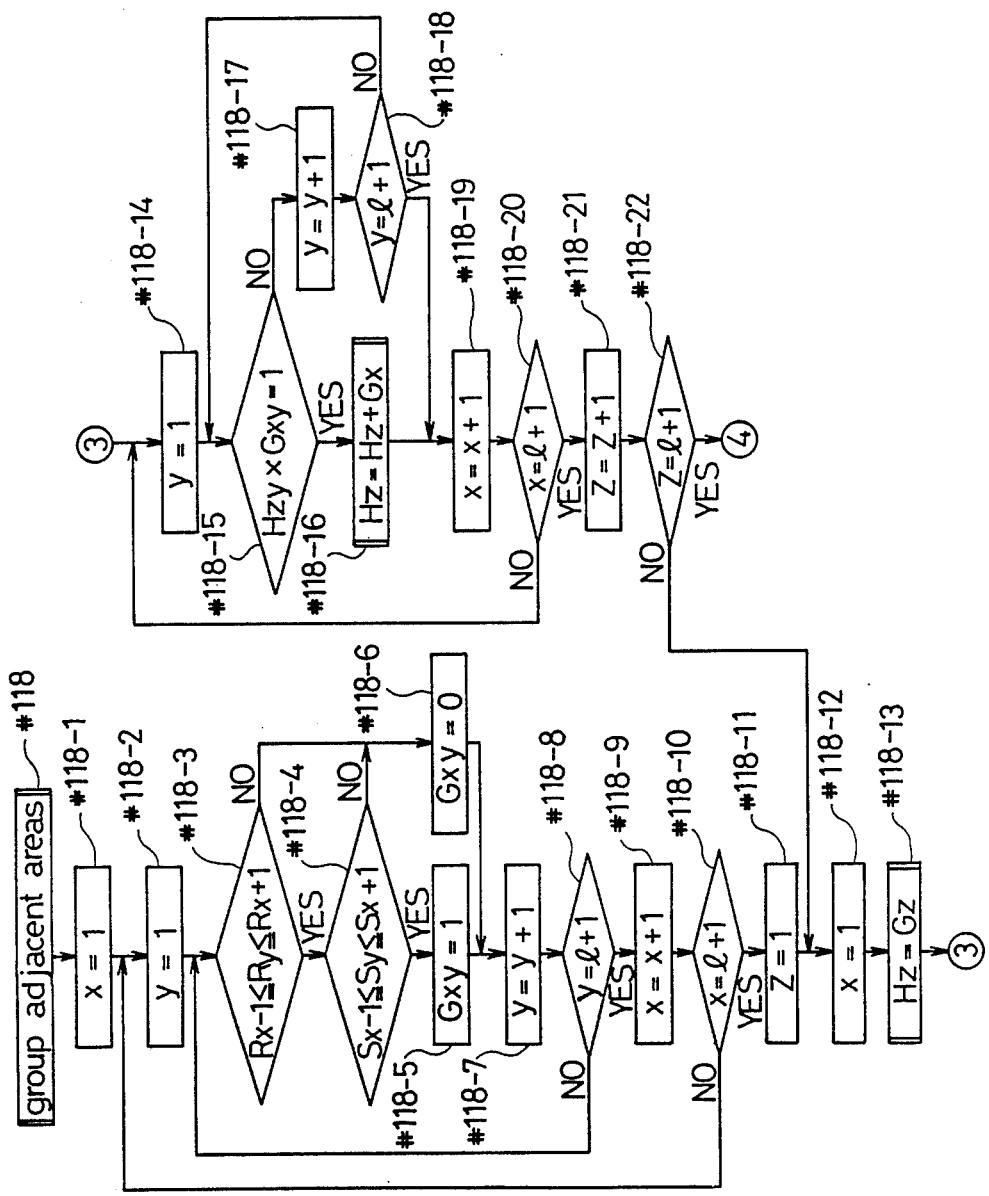
Figure 14:
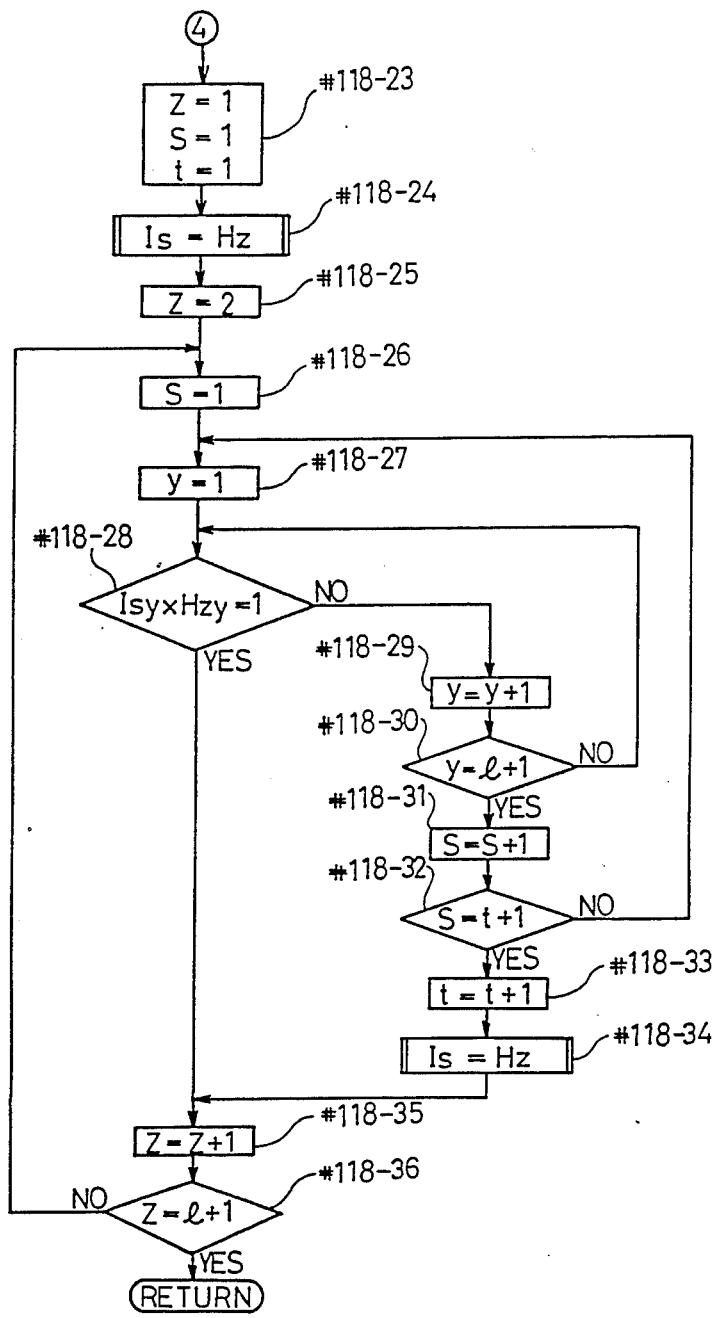

Nextly, a subroutine of grouping adjacent distance measuring areas at step #118 is shown in FIG. 13 and 14, in which "x" and "y" are reset at steps #118-1 and #118-2, it being judged whether the numbers "i" and "j" of the distance measuring areas detected at step #117 are within ±1 at steps #118-3 and #118-4, and when it is within ±1, the distance measuring areas are judged to be adjacent to each other, and "1" is substituted in Gxy at step #118-5. When the numbers "i" and "j" are not within ±1 at step #118-3 and #118-4, the distance measuring areas are judged not to be adjacent to each other, and "0" is substituted for Gxy at step #118-6. Then, "y" is incremented at step #118-7, and it is judged whether the operations with respect to all the picked-up distance measuring areas have been completed at step #118-8. When not completed, similar operations are repeated. On the countrary, when completed, "x" is incremented at step #118-9 and it is judged whether the operations with respect to all the picked-up distance measuring areas have been completed at step 118-10. When not completed, "y" is reset at step #118-2 and similar operations are repeated till y=1 to 1. As shown in FIG. 25, relating to the picked-up nine distance measuring areas (in this case, 1=9) shown in FIG. 24, to which distance measuring area each of the nine distance measuring areas is adjacent can be found by seeing the table of FIG. 25 in the lateral direction in such a manner that no distance measuring area is adjacent to the distance measuring area 1, the distance measuring areas 3, 4 being adjacent to the distance measuring area 2, the distance measuring areas 2, 4, 5, 6 being adjacent to the distance measuring area 3 and so on.

When the operations with respect to all the picked-up distance measuring areas have been completed at step #118-10, "z" and "x" are reset at steps #118-11 and #118-12, and Gz is transferred to Hz at step #118-13. Then, "y" is reset at step #118-14, and the product of Hzy and Gxy is found at step #118-15. When the product is "1", the elements of Hz and Gx are added together and the sum is newly substituted in Hz at step #118-16. When the product is not "1" at step #118-15, "y" is incremented at step #118-17 and it is judged whether the processing of all the elements has been completed at step #118-18. When it has not been completed, similar processing is repeated. When completed, at step #118-19, "x" is incremented and it is judged whether the processing of "x" to the last element thereof has been completed. When it has not been completed, similar processing is repeated. When completed, "z" is incremented at step #118-21, and it is judged whether all the processing has been completed at step #118-22. If it has not been completed at this stage, similar processing is repeated hereafter. This is necessary for arranging the groups as shown in FIG. 26 after grouping the distance measuring areas as shown in FIG. 25.

When all the processing is judged to have been completed at step #118-22, "z", "s" and "t" are reset at step #118-23 in FIG. 14, and Hz is substituted for Is at step #118-24. Then, z=2 is set at step #118-25, and "s" and "y" are reset at step #118-26 and #118-27. At step #118-28, the product of Isy and Hzy is found, and when the product is not "1", "y" is incremented at step #118-29. At step #118-30, it is judged whether the processing of all the elements has been completed, and when it has not been completed, similar processing is carried out. When completed, "s" is incremented at step #118-31. At step #118-32, it is judged whether the comparison of all kinds have been completed. When it has not been completed, "y" is reset at step #118-27 and similar processing is repeated. When all completed, it is regarded as not being in conformity with any kind of stored group and "t" is incremented at step #118-33. At step #118-34, Hz is substituted for Is.

On the contrary, when it is judged that IsV.Hzy=1 at step #118-28, they are regarded as the same kind of groups, and "z" is incremented at #118-35. At step #118-36, it is judged whether the processing with respect to all the groups has been completed, and when it has not been completed, "s" is reset at step #118-26 and similar processing is repeated. When all completed, the processing is ended and the program returns to the main routine.

After completing this processing, three groups enclosed by dotted lines in FIG. 26 are stored in Is. The content is shown in FIG. 27.

Figure 15:
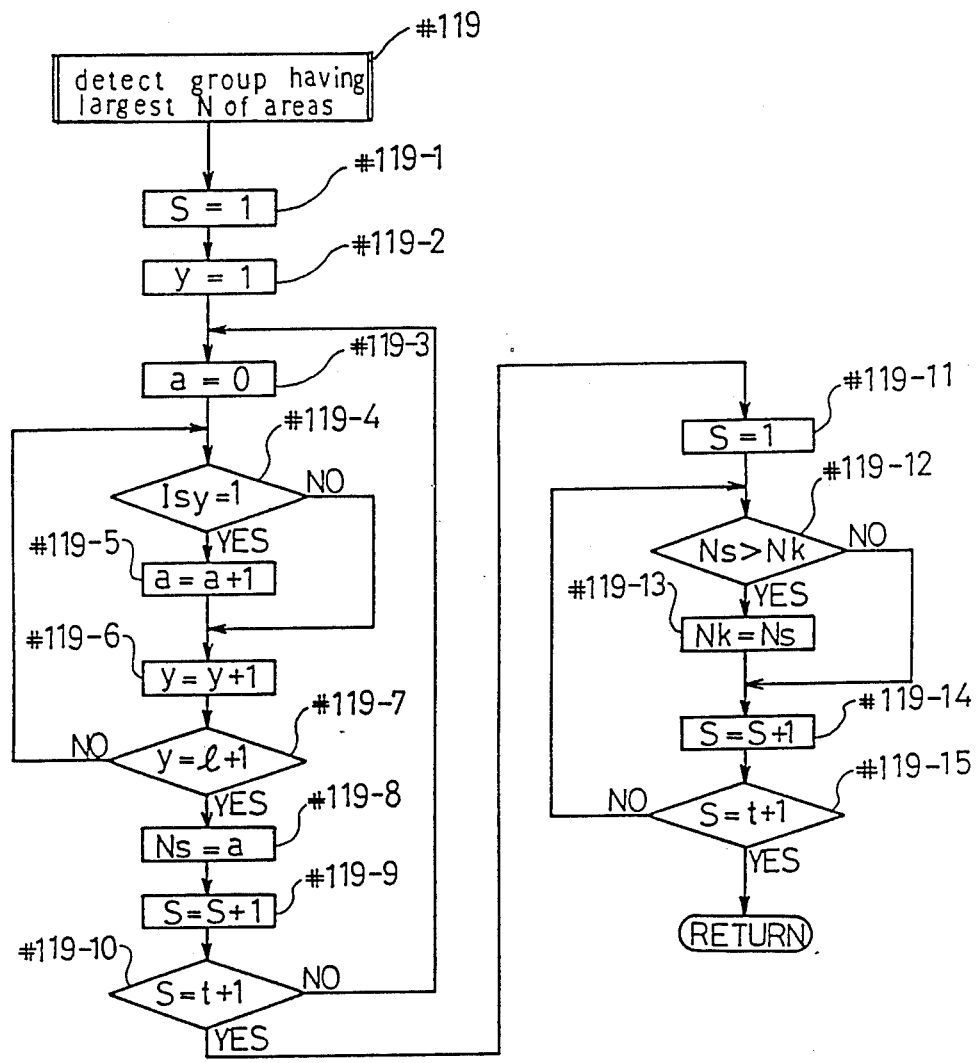

Nextly, the number N of the adjacent distance measuring areas classified into groups at step #118 is counted at step #119, and the largest value is detected. A subroutine for carrying out this operation is shown in FIG. 15.

Firstly, "s", "y" and "a" are reset at steps #119-1, #119-2, and #119-3 respectively. At step #119-4, Isy is read and it is judged whether Isy is "1". When Isy is "1", it is counted at step #119-5 and "y" is incremented at step #119-6. When Isy is not "1", it is not counted and "y" is incremented at step #119-6. At step it is judged whether the processing with respect to all the elements has been completed, and when it has not been completed, similar processing is carried out. When all completed, the number "a" of the distance measuring areas of the group number "s" is stored in Ns. Then "s" is incremented at step #119-9. At step #119-10, it is judged whether the processing with respect to all the groups has been completed. When it has not been all completed, similar processing is repeated. When all completed, "s" is reset at step #119-11. At step #119-12, it is judged whether the number Ns of the distance measuring areas of each group is larger than the foregoing largest value Nk. When Ns is larger than Nk, the number Ns of the distance measuring areas is newly stored in Nk at step #119-13, when Ns is not larger than Nk, "s" is incremented at step #119-14. At step #119-15, it is judged whether the processing with respect to all the groups has been completed. When it has not been completed, similar processing with respect to the next group is carried out. When all completed, the program returns to the main routine.

Figure 16:
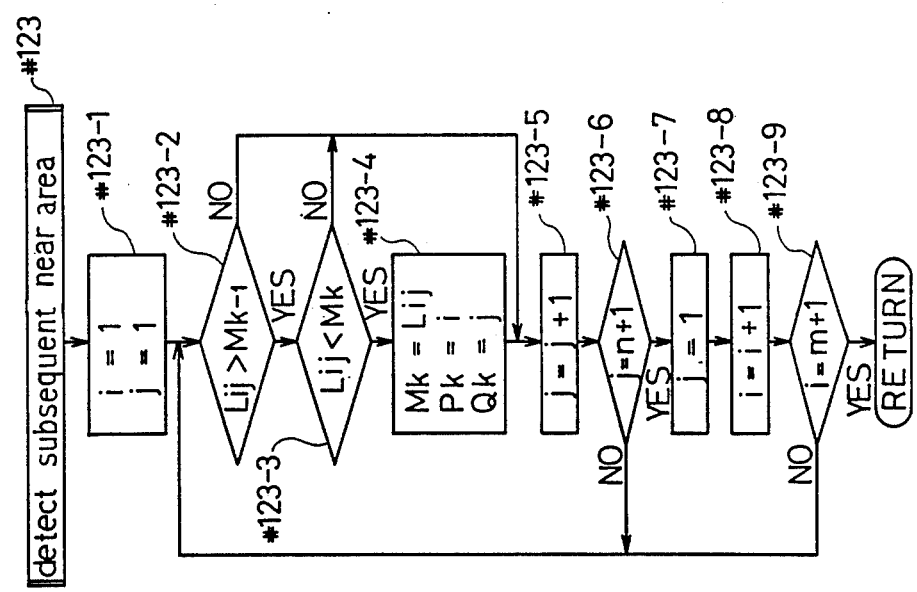

Now, step #123 of detecting subsequent near distance measuring area will be described with reference to a subroutine shown in FIG. 16.

Firstly, "i" and "j" are reset respectively at step #123-1. At step #123-2, it is judged whether the object distance Lij is larger than the shortest object distance Mk-1. When Lij is larger than Mk-1, Lij is compared with Mk in which the next to the largest object distance is stored at step #123-3. When Lij is smaller than Mk, the value Lij is newly stored in Mk at step #123-4, and at the same time, the numeral "i" and "j" of that distance measuring area are stored in Pk and Qk. When Lij is smaller than Mk-1 at step #123-2, no processing is executed, and "j" is incremented at step #123-5. At step #123-6, it is judged whether the processing has been completed to the distance measuring area at the end of each line. When it has not been completed, similar processing is repeated. When completed, "j" is reset at step #123-7, and "i" is incremented at step #123-8. Then, at step #123-9, it is judged whether the processing has been completed to the distance measuring areas in the last line. When it has not been completed, similar processing is repeated. When the processing with respect to all the distance measuring areas has been completed, the program returns to the main routine.

Figure 17:
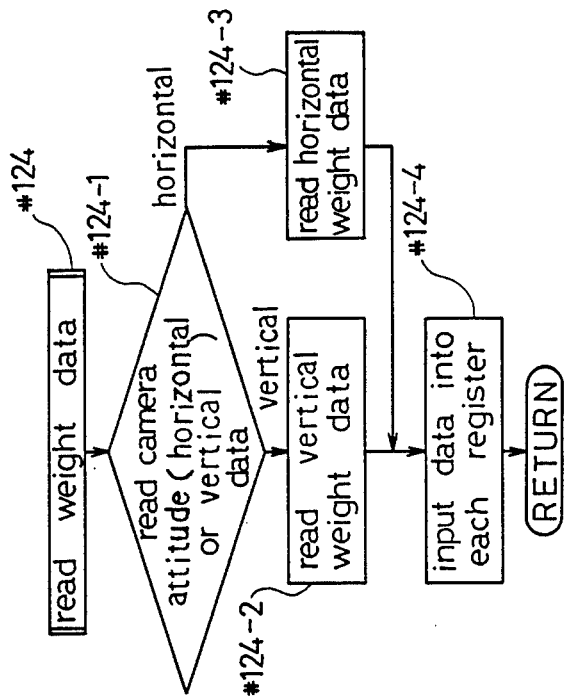

Now, a subroutine for reading the weight data Wij at step #124 will be described with reference to FIG. 17.

Firstly, at step #124-1, it is read from the camera attitude detecting device 61 whether the camera is in the horizontal or vertical attitude. When it is in the vertical attitude, the vertical weight data are read at step #124-2, and when in the horizontal attitude, the horizontal weight data are read at step #124-3. At step 124-4, that weight data are inputted in registers in correspondence with the distance measuring areas respectively, and the program returns to the main routine.

Figure 18:
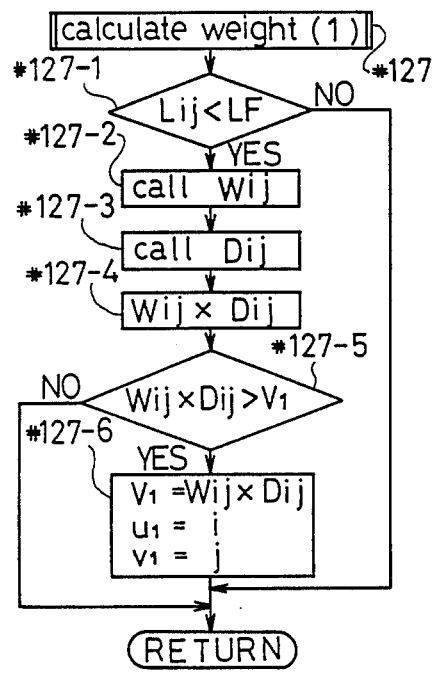

Now, the weight value calculation (1) for flash photography at step #127 will be described with reference to a subroutine of FIG. 18. At step #127-1, the object distance Lij at a distance measuring area of the number (i, j), and the flashlight reaching distance LF are compared with each other. When Lij is smaller than LF, a weight data Wij according to the position of the distance measuring area in the photographing scene in correspondence with the distance measuring area of number (i, j) is read from the corresponding register. At step #127-3, the weight data Dij in correspondence with the object distance of the distance measuring area of number (i, j) is read. Then, at step #127-4, the product of the weight data Wij according to the position of the distance measuring area in the photographing scene and the weight data Dij according to the object distance is calculated. At step 127-5, Wij.Dij and V1 in which the largest weight value is stored are compared with each other. When Wij.Dij is larger than V1, Wij.Dij is newly stored in V1 at step #127-6. At the same time, the numbers (i, j) of that distance measuring area are stored in u1, v1 respectively. On the contrary, Lij is larger than LF at step #127-1 or when V1 is larger than Wij.Dij at step #127-5, no processing is executed and the program returns to the main routine.

Figure 19:
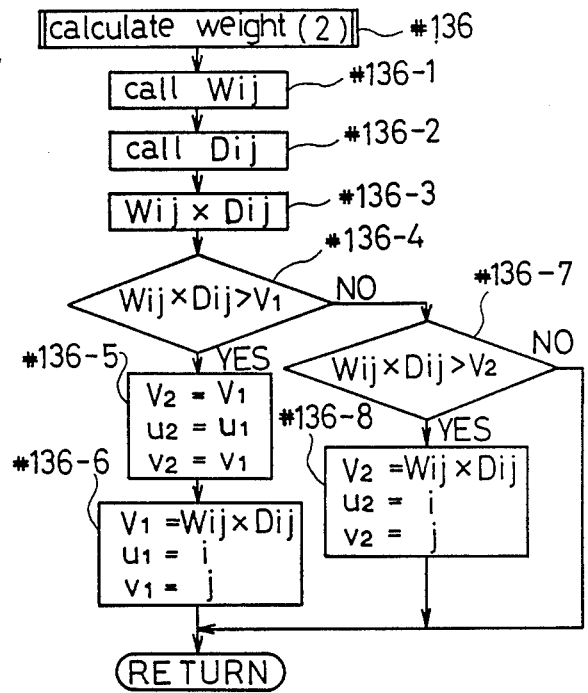

Now, the weight value calculation (2) for daylight photography at step #136 will be described with reference to FIG. 19. Firstly, at step #136-1, the weight data Wij according to the position of the distance measuring area of the number (i, j) in the photographing scene is read. Then, at step #136-2, the weight data Dij according to the object distance of the distance measuring area of the number (i, j) is called. At step #136-3, the product of Wij and Dij is found. At step #136-4, Wij.Dij and V1 are compared with each other. When Wij.Dij is larger than V1, at step #136-5, the foregoing largest value V1 is transmitted to V2 in which the second weight value is stored, and at the same time, the number of the distance measuring area stored in u1 and v1 are transmitted to u2 and v2 respectively. Then, at step #136-6, the weight value Wij.Dij of the distance measuring area of the number (i, j) is newly stored in V1, and at the same time the numbers "i", "j" of that distance measuring area are stored in u1, v1 respectively, and the program returns to the main routine.

On the contrary, when Wij.Dij is smaller than V1 at step #136-4, Wij.Dij is compared with V2 in which the next to the largest weight value is stored at step #136-7. When Wij.Dij is larger than V2, Wij.Dij is newly stored in V2 at step #136-8, and at the same time, the numerals (i, j) of that distance measuring area are stored in u2, v2 respectively. When v2 is larger than Wij.Dij at step #136-7, no processing is carried out and the program returns to the main routine.

Figure 20:
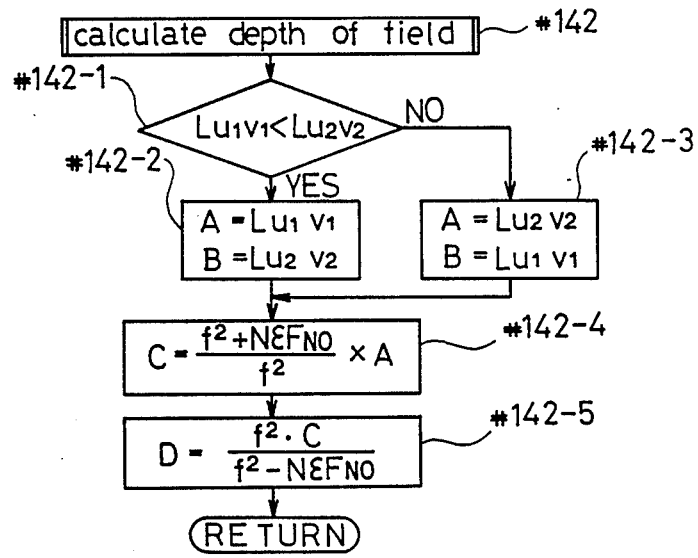

Now, the calculation of the depth of field will be described with reference to a subroutine of FIG. 20. Firstly, at step #142-1, the object distances Lu1v1, Lu2v2 of the distance measuring areas of which the weight values calculated at step #136 are the largest and the next to the largest respectively are compared with each other, and the smaller one is substituted for A and the larger one is for B at steps #142-2, #142-3 respectively. Then, at step #142-4, such an object distance C as to make the nearer object distance A to be the close point of the depth of field is found, and at step #142-5, the distant point D to be the far point of that depth of field is calculated, and the program returns to the main routine.

Figure 21:
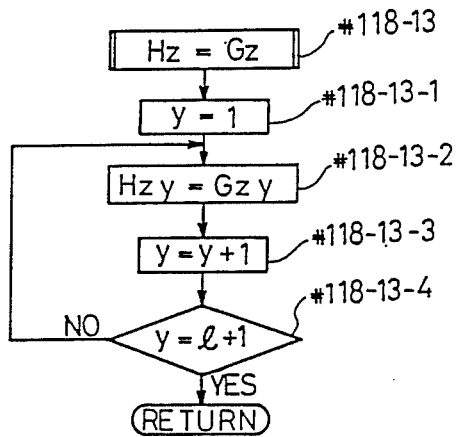

Now, Hz=Gz at step #118-13 in the subroutine of step #118 shown in FIG. 13 will be described with refence to FIG. 21. Firstly, "y" is reset at step #118-13-1, and Gzy is substituted for Hzy at step #118-13 2. Then, "y" is incremented at step #118-13-3, and at step #118-13-4, it is judged whether the processing with respect to all the elements of the group Gz has been completed. When it has not been completed similar processing is successively repeated. When completed, the program returns to the subroutine of step #118.

Figure 22:
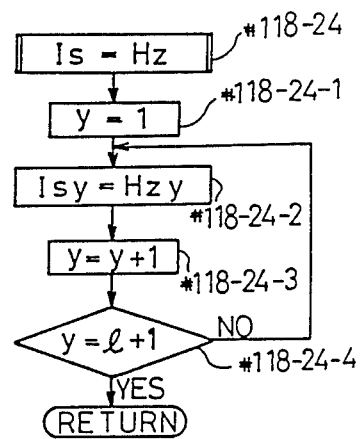

Now, Is=Hz at step #118-24 will be similarly described with reference to FIG. 22. At step #118-24-1, "y" is reset and at step #118-24-2, Hzy is substituted for Isy. Then, at step #118-24-3, "y" is incremented and at step #118-24-4, it is judged whether the processing has been all completed. When it has not been completed, similar processing is successively repeated. When completed, the program returns to the subroutine of step #118.

Figure 23:
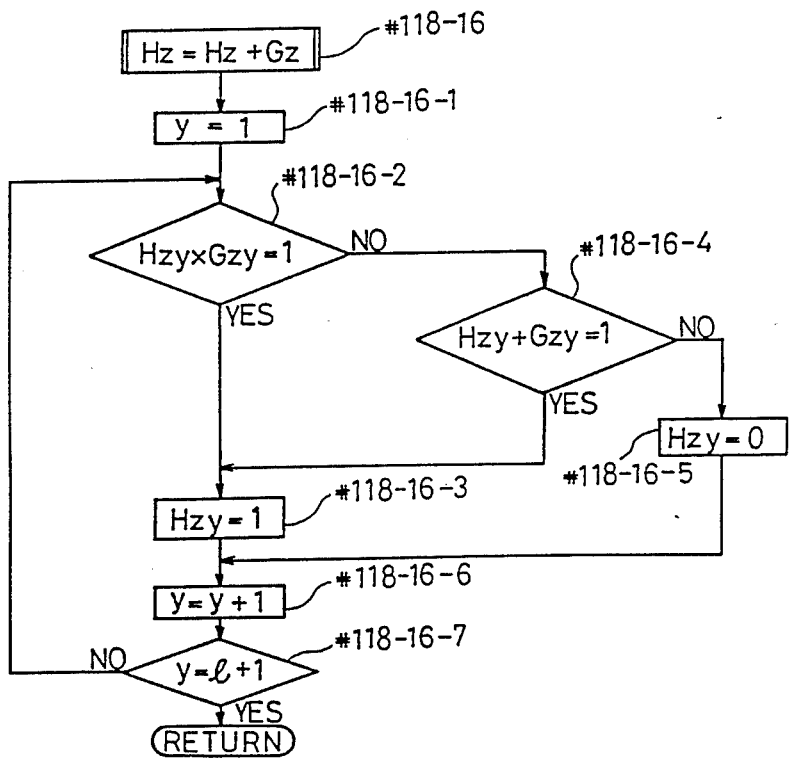

Now, $Hz = Hz + Gz$ at step #118-16 will be described with reference to FIG. 23. Firstly, at step #118-16-1, "y" is incremented and at step #118-16-2, whether both of Hzy and Gzy are "1" are judged by finding Hzy.Gzy. When both of Hzy and Gzy are "1", "1" is substituted for Hzy at step #118-16-3. When it is judged that Hzy.Gzy is not "1" at step #118-16-2, the sum of Hzy and Gzy is found at step #118-16-4. When the sum is "1", it is judged that either one is "1" and the other is "0", and similarly "1" is substituted for Hzy at step #118-16-3. When the sum of Hzy and Gzy is not "1" at step #118-16-4, it is judged that neither of Hzy and Gzy are "1", and at step #118-16-5, "0" is substituted for Hzy. Then, at step #118-16-6, "y" is incremented and at step #118-16-7, it is judged whether the processing has been all completed. When it has not been completed, similar processing is repeated. When completed, the program returns to the subroutine of step #118.

While the embodiments of the present invention, as herein disclosed, constitute a preferred from, it is to be understood that other forms might be adopted.

What is claimed is:

1. In a device for measuring object distance or in-focus position used for a camera in which object distances or focus adjustment states are measured in a plurality of distance measuring areas in the photographing scene, said device comprising:

calculating means having a plurality of weight data predetermined in correspondence with the position of each distance measuring area in the photographing scene and the object distance, for calculating a weight value by reading the weight data of each distance measuring area in correspondence with the position of an object in the photographing scene and the measured object distance, and means for judging to be a main object, an object in the distance measuring area of which the weight value calculated by the calculating means is the largest.

2. A device for measuring as claimed in claim 1, wherein the weight data is predetermined according to the position, such that weight data of the distance measuring areas in the central position of the photographing scene is larger than that in the peripheral portion thereof.

3. A device for measuring as claimed in claim 2, wherein the peripheral portion of the photographing scene, the weight data of the upper distance measuring area is smaller than that of the lower distance measuring area.

4. A device for measuring as claimed in claim 1, wherein the weight data of each distance measuring area in correspondence with the position is changed-over with attitude of a camera body between the horizontal position and the vertical position.

5. A device for measuring as claimed in claim 1, wherein the weight data of each distance measuring area in correspondence with the position is changed-over in correspondence with focal length of a photographic lens.

6. A device for measuring as claimed in claim 1, further comprising second judging means for judging whether a first object distance in a first distance measuring area having the largest weight value and a second object distance in a second distance measuring area having weight value next to the largest one are within depth of field of the photographic lens, and determining either of the distance as that to be focussed when they are within the depth of field.

7. In a device for measuring object distance or in-focus position used for a camera in which object distances or focus adjustment states are measured in a plurality of the distance measuring areas in the photographing scene, said device comprising:

means for comparing a difference between object distances of adjacent distance measuring areas with a predetermined value and means for judging adjacent objects to be the same object when the difference of the object distances is within the predetermined value, and determining means for determining whether the judged object is a main object in accordance with the size of the same object in the photographing scene.

8. A device for measuring as claimed in claim 7, wherein said determining means determines the judged same object as a main object, when the size of the same object is larger than a predetermined reference size.

9. A device for measuring as claimed in claim 8, wherein said a process means for successively processing judgements of the main object in the order of subsequent near object distance from the object having the nearest object distance.

10. A device for measuring as claimed in claim 8, wherein the reference size for judging a main object is changed in correspondence with the focal length of a photographic lens.

11. In a device for measuring object distance or in-focus position used for a camera in which the object distance or focus adjustment states are measured in a plurality of distance measuring areas in the photographing scene, said device comprising:

first judging means for judging a main object based on the size of an object within the photographing scene when there are one or more objects in the position nearer than a predetermined distance, and second judging means for judging a main object based on the position of an object in the photographing scene and the object distance when there is no object in the position nearer than a predetermined distance or when there is no object of a predetermined size in the photographing scene.

12. A device for measuring as claimed in claim 11, wherein said second judging means has weight data predetermined in correspondence with the position of each distance measuring area in the photographing scene and the object distance.

13. A device for measuring as claimed in claim 11, further comprising third judging means for judging a main object by comparing a difference between object distances of adjacent distance measuring areas with a predetermined value and judging adjacent objects as the same object when the difference of the object distance is within the predetermined value.

14. In a device for measuring object distance or in-focus position used for a camera in which the object distance or focus adjustment states are measured in a plurality of distance measuring areas in the photographing scene, said device comprising:

means for comparing, in flashlight photography, the object distance of each distance measuring area within the flashlight reaching distance, and means for carrying out a process of judging a main object with respect only to the distance measuring areas in which there are one or more objects nearer than the flashlight reaching distance.

15. A device for measuring as claimed in claim 14, wherein said carrying out means has weight data predetermined in correspondence with the position of each distance measuring area in the photographing scene and the object distance.

* * * * *